T. PENDERGAST.
Thill-Coupling.
No. 45,519.
Patented Dec. 20, 1864.
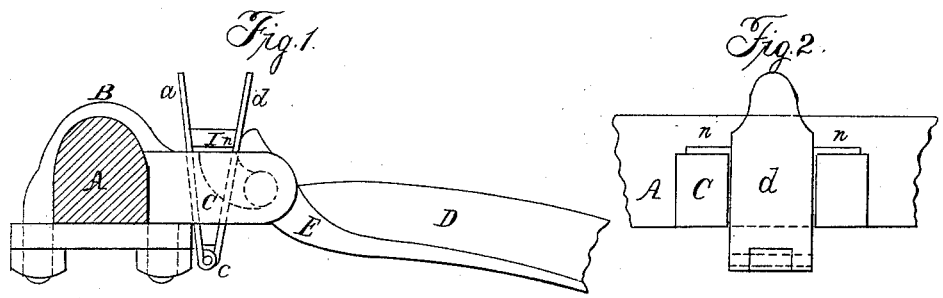
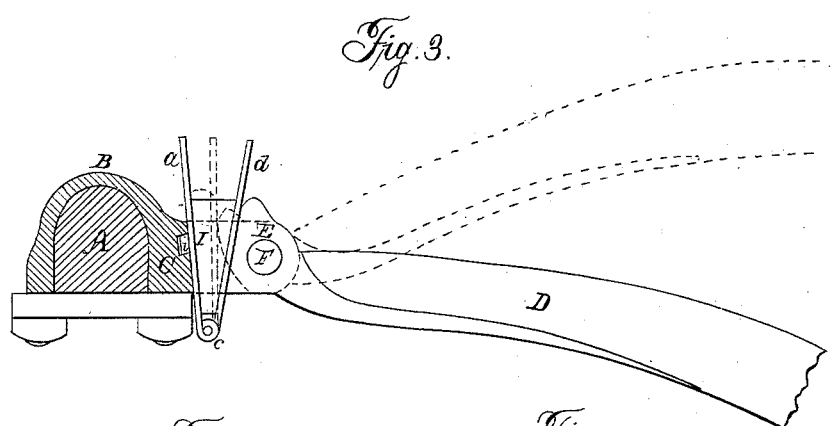
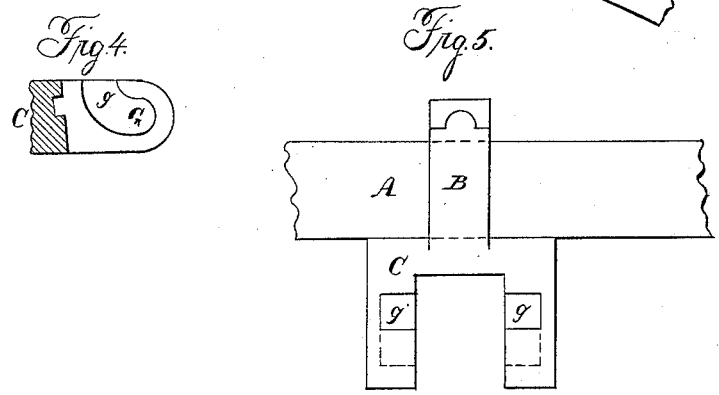
Witnesses.
John E. Earle
Rufus Sanford
Inventor.
T. Pendergast

United States Patent Office.

TIMOTHY PENDERGAST, OF NEW HAVEN, CONNECTICUT.

IMPROVEMENT IN COUPLINGS FOR CARRIAGE-SHAFTS.

Specification forming part of Letters Patent No. 45,519, dated December 20, 1864.

*To all whom it may concern:*

Be it known that I, TIMOTHY PENDERGAST, of New Haven, in the county of New Haven and State of Connecticut, have invented a new and useful Improvement in Couplings for Carriage-Shafts; and I do hereby declare the following to be a full, clear, and exact description of the same, when taken in connection with the accompanying drawings and the letters of reference marked thereon, and which said drawings constitute part of this specification, and represent, in—

Figure 1, a side view of a coupling and shaft and section of the axle-tree; Fig. 2, a front view of the same, the shaft removed; Fig. 3, a sectional view of a coupling, the shaft in two positions; Fig. 4, a top view of the coupling, and in Fig. 5 a partial section of the same to show manner of attaching the shaft.

Similar letters indicate corresponding parts in the several figures.

It is often desirable to remove the shafts from a carriage for the purpose of inserting a pole, or vice versa. In nearly or quite all the couplings now used for such purposes it is required to take out bolts or bring into use other mechanical devices than such as form part of the coupling, which occasions no small amount of difficulty and loss of time.

The object of my invention, therefore, is to construct a coupling which shall be complete in itself, at the same time simple, cheap, and safe.

In order to fully illustrate my invention, as well as to enable others to make and use the same, I will proceed to describe its construction and operation, as shown in the accompanying drawings.

A represents the axle-tree of a carriage, to which the coupling C is secured in the usual manner by the clip B. To the rear end of the shaft D, I fix a connection, E, in the usual manner, which connection is provided with projections F from each side, which are formed so as to slip into a seat, G, formed in each side of the coupling, through grooves $g$, (see Figs. 4 and 5,) and when in place, as seen in black, Fig. 3, there will be a space between the shaft-connection and back of the coupling. Into this space I place a key, constructed in the following manner: Two thin, flat pieces of metal, $a$ $d$, of the proper width and length, as seen in Figs. 1, 2, 3, are hinged together at $c$, their lower ends. Between the said two pieces I place a piece of rubber or other elastic material, I, and on the part $a$ form a projection, $i$. This completes the key. When the shafts are in place, as before described, and seen in Fig. 3, in black, insert the said key, as in black; the projection $i$ will spring into a notch in the back of the couplings as see Fig. 3.

The connection E upon the shaft are of an eccentric form, so that when the shafts are down, as in black, Fig. 3, there is very little pressure upon the key, simply enough to hold the shafts in their seats. If in this position it is desirable to remove the shafts, press the sides of the key together (by taking hold of their upper ends, formed for that purpose) sufficiently to withdraw the projection $i$ from the notch; the key may then be drawn from its place and the shafts removed. When in place and the horse attached, the shafts will be raised, as in red, Fig. 3. Owing to the eccentricity of the shaft-connection, the key will be compressed, as denoted in red, which compression entirely prevents any play of the connection in the couplings, and when at rest the compression is relieved, so that the rubber will stand much longer than if constantly compressed.

To cover the grooves $g$ to prevent sand or other foreign particles from entering the seat in the coupling, I attach a thin piece of metal, $n$, to each side of the key of sufficient size to cover the grooves as See Figs. 1 and 2.

I have described my couplings as for shafts only, comprehending in the word "shafts" poles or other similar attachment for carriages.

Having therefore described my invention, I do not broadly claim a spring-key for the purpose of retaining carriage-shafts in their coupling; but What I do claim as new and useful, and desire to secure by Letters Patent, is—

A key constructed as described, in combination with an eccentrically-formed connection, E, and coupling C, when arranged to operate in the manner and for the purpose specified.

TIMOTHY PENDERGAST.

Witnesses:
 JOHN E. EARLE,
 RUFUS SANFORD.